(12) United States Patent
Wojtczak et al.

(10) Patent No.: US 12,491,822 B2
(45) Date of Patent: Dec. 9, 2025

(54) AUTOMOTIVE ROOF RAIL SYSTEM

(71) Applicant: LACKS ENTERPRISES, INC., Grand Rapids, MI (US)

(72) Inventors: Brian Wojtczak, Grand Rapids, MI (US); Thomas Hawkins, Lowell, MI (US); Paul Nikandrou, Caledonia, MI (US); Ryan Lacks, Grand Rapids, MI (US); Nick Hrnyak, Grand Rapids, MI (US)

(73) Assignee: LACKS ENTERPRISES, INC.

( * ) Notice: Subject to any disclaimer, the term of this patent is extended or adjusted under 35 U.S.C. 154(b) by 52 days.

(21) Appl. No.: 18/412,743

(22) Filed: Jan. 15, 2024

(65) Prior Publication Data

US 2024/0149794 A1 May 9, 2024

Related U.S. Application Data

(62) Division of application No. 16/923,619, filed on Jul. 8, 2020, now Pat. No. 11,872,959.

(Continued)

(51) Int. Cl.
*B60R 9/04* (2006.01)
*B29C 45/00* (2006.01)
(Continued)

(52) U.S. Cl.
CPC ............ *B60R 9/04* (2013.01); *B29C 45/1676* (2013.01); *B62D 65/16* (2013.01); *C25D 5/022* (2013.01);
(Continued)

(58) Field of Classification Search
CPC ........... B60R 9/04; B60R 9/052; B60R 13/06; B29C 2045/172; B29C 2045/0079;
(Continued)

(56) References Cited

U.S. PATENT DOCUMENTS 4,901,902 A * 2/1990 Stapleton .................. B60R 9/04
224/326
2011/0316306 A1* 12/2011 Grgac ................. B29C 45/1711
296/210

(Continued)

FOREIGN PATENT DOCUMENTS

| CN | 108944699 A | * 12/2018 | ............... B60R 9/05 |
| DE | 202012104672 U1 | * 2/2013 | |
| FR | 2794702 A1 | * 12/2000 | ............... B60R 9/04 |

OTHER PUBLICATIONS

Translation of CN108944699 (Year: 2018).*

(Continued)

*Primary Examiner* — Matthew P Travers
(74) *Attorney, Agent, or Firm* — Dickinson Wright PLLC (57) ABSTRACT

A roof rail includes a gasket that is formed of a liquid gasket material that is applied in a liquid state and cured to define a gasket. The liquid gasket material may be applied robotically. The liquid gasket material may be applied either before or after the roof rail is attached to a corresponding vehicle structure. The gasket may be recessed, flush, or proud relative to a lower surface of the roof rail. The liquid gasket material may be applied during the molding process of the roof rail. The roof rail may be formed of a plateable resin material, and the liquid gasket material may be non-platable and bonded bond to the plateable resin material. The roof rail having the gasket may be plated, with the plating material bonding to the areas of the roof rail that are not covered by the gasket.

16 Claims, 4 Drawing Sheets

Related U.S. Application Data (60) Provisional application No. 62/871,399, filed on Jul. 8, 2019.

(51) Int. Cl.
  *B29C 45/16* (2006.01)
  *B29C 45/17* (2006.01)
  *B60R 13/06* (2006.01)
  *B62D 65/16* (2006.01)
  *C25D 5/02* (2006.01)
  *C25D 5/56* (2006.01)
  *C25D 7/00* (2006.01)

(52) U.S. Cl.
  CPC ............... *C25D 5/56* (2013.01); *C25D 7/00* (2013.01); *B29C 2045/0079* (2013.01); *B29C 2045/172* (2013.01); *B60R 13/06* (2013.01)

(58) Field of Classification Search
  CPC ............... B29C 45/16; B29C 45/164; B29C 45/1676–2045/1678; C25D 5/022; C25D 5/56; C25D 7/00; C25D 7/04; B62D 65/02; B62D 65/16
  See application file for complete search history.

(56) References Cited

U.S. PATENT DOCUMENTS

| | | | |
|---|---|---|---|
| 2013/0154153 A1* | 6/2013 | Jacobson | B29C 45/1676 264/255 |
| 2018/0134226 A1* | 5/2018 | Dellock | C25D 5/56 |

OTHER PUBLICATIONS

Translation of DE202012104672 (Year: 2013).*
Translation of FR2794702 (Year: 2000).*
SPC; "Which Plastics Can and Cannot be Plated Onto?"; Retrieved 2025 (Year: 2025).*

* cited by examiner

AUTOMOTIVE ROOF RAIL SYSTEM

CROSS-REFERENCE TO RELATED APPLICATIONS

This application is a divisional application of U.S. patent application Ser. No. 16/923,619, filed Jul. 8, 2020, and claims the benefit of U.S. Provisional Application No. 62/871,399 filed Jul. 8, 2019 entitled "Automotive Roof Rail System". The entire disclosure of the above applications are incorporated herein by reference as though set forth fully herein.

FIELD OF THE DISCLOSURE

The present disclosure relates to automobile roof rail structures. More particularly, the present disclosure relates to an automobile roof rail structure and gasket.

BACKGROUND OF THE DISCLOSURE

Automotive vehicles, including traditional vehicle, electric vehicles, and hybrid vehicles, are typically constructed to allow for various aftermarket components to be installed on the vehicle. For example, vehicles may include a roof rack or a trailer hitch.

Roof rack design and construction can vary among different vehicle types. In some cases, a roof rack may be constructed to include side rails that extend along the traveling direction of the vehicle, to which cross rails that extend across the vehicle body may be mounted. Roof racks may also include cross rails that are pre-installed to the side rails.

The roof rack permits various aftermarket accessories to be mounted to the vehicle to increase the vehicle's storage capabilities or luggage handing abilities. For example, a box may be installed to the roof rack, allowing for additional luggage carrying capacity, which can be beneficial for long trips. Alternatively, large items of cargo may be attached to the roof rack when the cargo item is too large for the inside of the vehicle. For example, a piece of furniture may be tied down to the roof rack structure.

Various other types of roof rack structures may be attached to the roof rack for carrying specific types of cargo. For example, a mounting structure specifically configured to carry skis may be installed onto the roof rack. Similarly, a mounting structure specifically arranged to carry bicycles may be attached to the roof rack.

Accordingly, the roof rack can be an important component to include on a vehicle body to enable these and other various cargo-carrying abilities to suit the specific needs of the vehicle user. It will be appreciated that the various needs of individual users can vary, such that the roof rack may be designed to enable many different types of attachment structures.

However, the installation of roof racks on a vehicle may not be specifically desired by some drivers. For instance, some drivers or vehicle owners may not have a desire or need to carry large items of cargo and may not require the benefits of the roof rack. When included on a vehicle body, a roof rack adds weight and drag relative to a vehicle without a roof rack.

In some instances, the roof rack is designed and installed on the vehicle such that it only includes the two side rails, and does not include the cross rails. Typically, the cross rails add more drag to the vehicle relative to the side rails, due to the direction of the travel and the direction of wind resistance. The side rails are typically limited to being exposed to wind resistance over a small forward facing cross section. Cross rails, on the other hand, are exposed to wind resistance across substantially their entire length.

However, in the case of the side rails, the side rails may include an open space underneath the rail structure between the rail and the top of the vehicle body. This open space can create additional wind resistance.

As described above, not every vehicle owner may desire a roof rack, and as such, vehicles may have a base design in which roof rails are not included. For vehicles where a roof rack is desired, the roof rails may be installed as an add-on or after-market component to the existing vehicle body. In such instances, the roof rail is mounted and fastened to the vehicle roof structure, which is typically in the form of a sheet metal structure. Fasteners may be used to attach to the roof rail to the sheet metal.

Due to this type of attachment, the roof rail may be fixed to the vehicle body and may typically receive loads and vibration that propagate through the vehicle. Accordingly, the roof rack design may require that it can withstand the various loads and vibrations from the vehicle. Additionally, this type of attachment can lead to rattle or shaking of the roof rack relative to the vehicle.

Due to the nature of fixing the roof rack to the upper surface of the vehicle, gaps may be present between the roof rack and the vehicle body. These gaps and spaces between the roof rack and the vehicle body may also be susceptible to passage of unwanted water or other debris.

To counteract these effects, roof racks are typically installed with a gasket mounted between the vehicle body and the roof rack. The gasket may operate to isolate the roof rails from the roof sheet metal. The gasket may also limit rattle conditions. The gasket may hide or fill the gaps between the roof rail and the sheet metal. The gasket may also assist in the management of water flow.

Typical roof rack gaskets may be made from a soft material, such as thermoplastic vulcanizate (TPV) or thermoplastic olefin (TPO). These types of material may typically be injection molded or extruded. Injection molded gaskets may match all of the features of the roof rack as the part is molded. Extruded gaskets are typically cut to length to match the roof rail, and may include an adhesive tape to allow the gasket to be attached to the roof rail. Some extruded gaskets may require an additional step of overmolding end pieces to form the desired shape for assembly to a roof rail.

In some approaches, a gasket can be constructed of a die-cut piece of compressible foam with adhesive tape. This piece of foam and tape may be attached to a uniform cross-section of the roof rail that is straight, and injection molded end gaskets are added to the front and rear ends of the roof rails.

In each of the above gaskets, various modifications and improvements are made to fit the gasket to the roof rail and reduce weight, tooling investment, and cost. However, each of the above operations include the need to assemble the gasket with the roof rail as a secondary operation, which adds time, cost, and complexity of final assembly.

In view of the above, improvements to the gaskets for roof rails can be made.

SUMMARY

It is an aspect of the disclosure to provide a roof rail system that reduces cost, complexity, and improves isolation and water resistance.

In one aspect, a method of manufacturing and installing a roof rail is provided. The method may include: applying a liquid gasket material to a lower surface of a rail member having an elongate shape; curing the liquid gasket material into a solid form to define a gasket; and plating the rail member in areas of the rail member that are not covered by the gasket.

In another aspect, a method of manufacturing a roof rail is provided. The method may include: forming a rail member having an elongate shape from a plateable resin material; applying a liquid gasket material to a lower surface of the rail member, wherein the gasket material is not plateable; curing the liquid gasket material into a solid form to define a gasket; and plating the rail member in areas of the rail member that are not covered by the gasket.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE DISCLOSURE

Example aspects of automotive roof rail system will now be more fully described. Each of these example aspects are provided so that this disclosure is thorough and fully conveys the scope of the inventive concepts, features and advantages to those skilled in the art. To this end, numerous specific details are set forth such as examples of specific components and methods associated with the system to provide a thorough understanding of each of the aspects associated with the present disclosure. However, as will be apparent to those skilled in the art, not all specific details described herein need to be employed, the example aspects may be embodied in many different forms, and thus should not be construed or interpreted to limit the scope of the disclosure.

Figure 1:
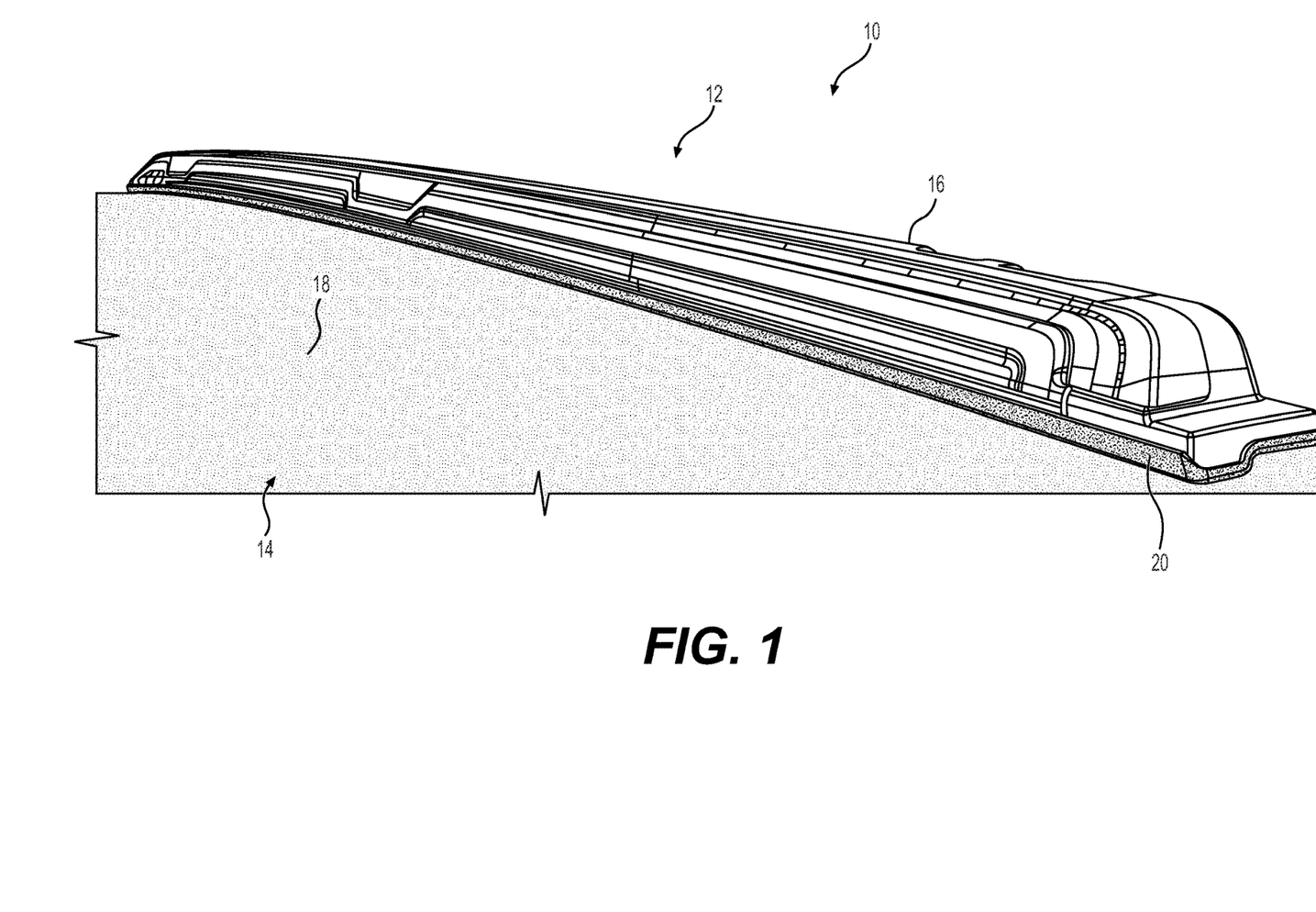
FIG. 1 is a perspective view of a roof rail system including a roof rail with a gasket mounted to an upper surface of a vehicle.
Figure 2:
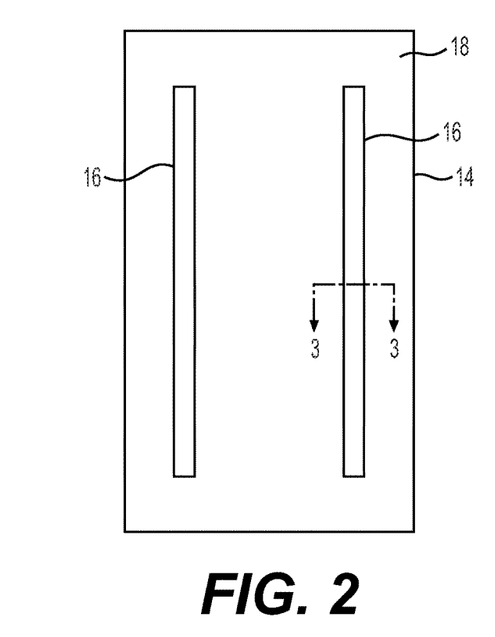
FIG. 2 is a schematic top view of the vehicle with a pair of roof rails attached.

With reference to FIGS. 1-2, a system 10 for mounting a roof rack assembly 12 to a vehicle 14 is provided. The roof rack assembly 12 may include a pair of rails 16 disposed on an upper surface 18 of the vehicle 14. A gasket 20 may be disposed between each of the rails 16 and the upper surface 18.

The rails 16 may be arranged on opposite lateral sides of the vehicle 14. For example, each of the rails 16 may be disposed on the roof of the vehicle 14 and extend longitudinally along an upper and outer edge of the vehicle 14. In one approach, in a four-door vehicle, the rails 16 may extend along the roof such that the rails 16 extend over both the front doors and the rear doors of the vehicle when viewed from the side.

The rails 16 typically extend from the front of the vehicle roof to the rear of the vehicle roof. However, it will be appreciated that the rails 16 may not extend fully to the front or rear edge of the vehicle roof. The rails 16 are typically spaced apart from each other a lateral distance that is sufficient to support cross rails (not shown) extending laterally between the rails 16. The rails 16, therefore, may be arranged on the roof such that they are closer to the outer lateral edge of the vehicle 14 than the mid-plane of the vehicle 14. It will be appreciated that the rails may take on a variety of different sizes, shapes and configurations and may be placed in a variety of different locations.

In one aspect, the rails 16 are arranged symmetrically relative to the mid-plane of the vehicle. Thus, in this approach, the rails 16 are each disposed a generally equal distance from both the mid-plane and the outermost edges of the roof of the vehicle. However, it will be appreciated that the rails 16 could be arranged on the roof in a non-symmetrical manner, such that one of the rails 16 is closer to the midplane than the other when the rails 16 are disposed on opposite lateral sides of the mid-plane. In another aspect, the rails 16 may be arranged on the same side of the mid-plane.

The rails 16 are typically aligned parallel to each other, such that the distance between the respective front ends of the rails 16 is the same as the distance between the respective back ends of the rails 16. Accordingly, a cross rail that extends laterally between the rails 16 may slide forward and rearward along the rails 16, if desired, and a lateral attachment mechanism can be installed on the rails 16 at any forward or rearward point given the even spacing at various forward and rearward locations. In other words the locations of the cross rails may be adjustable.

While two rails 16 have been discussed above, it will be appreciated that more than two rails 16 may be attached to the roof of the vehicle 14. It is also possible for a single rail to be attached to the vehicle, however it is typically preferable to have at least two rails 16 installed. For the purposes of discussion, a single rail 16 may be discussed. Unless otherwise noted, the discussion related to the single rail 16 being discussed can be applied equally to additional rails installed on the vehicle.

Figure 3:
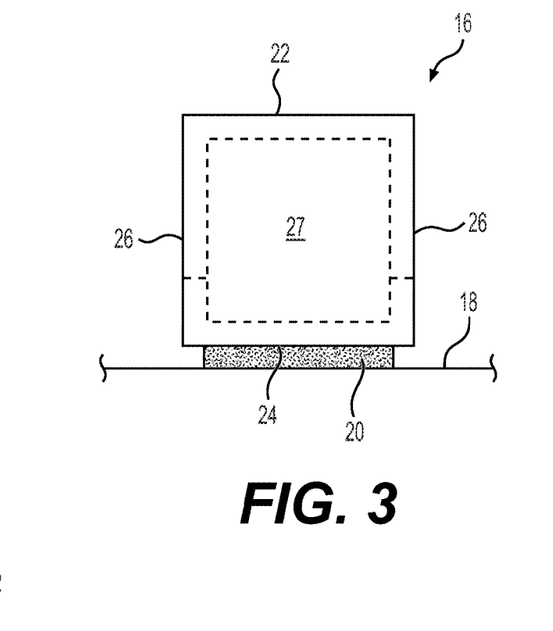
FIG. 3 is a schematic cross-sectional view of a roof rail with a gasket disposed between a lower surface of the roof rail and the upper surface of the vehicle.

With reference to FIG. 3, in one aspect, the rail 16 may include an upper surface 22, a lower surface 24, and opposing side surfaces 26. In this aspect, the rail 16 may have a generally box-like cross-section. However, it will appreciated that the cross-section of the rail 16 may take on various sizes and shapes to suit various design needs. For example, the box-like cross-section need not include flat surfaces for the upper surface 22 or side surfaces 26. These surfaces may have a variety of different shapes, sizes and configurations, including a convex curvature, concave curvature, a complex curvature with multiple turns and bends, or the like. In the case of the upper surface 22, the upper surface 22 is preferably convex, such that water may roll off the top of the upper surface and such that pooling of water on the rails 16 may be limited. The rail 16 may have other cross-sectional shapes, such as an oval or an airfoil shape.

The lower surface 24 may be shaped to generally correspond to the upper surface of the vehicle body on which the rail 16 is mounted. Typically, the rail 16 is mounted to the roof or upper surface 18 of the vehicle 14. However, the rails 16 may also be mounted to other portions of the vehicle body in some cases. For example, the rail 16 could be mounted to the trunk or to a bed area of a truck. For purposes of discussion, the rail 16 will be described as being mounted to the roof of the vehicle 14.

Moreover, it will be appreciated that the rail 16 cross-section may vary at different longitudinal locations along the rail 16. For example, the front and/or rear portions of the rail may be tapered relative to the middle of the rail 16 for reducing drag and for other aerodynamic or aesthetic benefits. Accordingly, the rail 16 may have a smaller or different shaped cross-section at the front and rear section relative to the middle section.

The rail 16 is configured to be mounted to the vehicle structure, and therefore the lower surface 24 of the rail 16 is configured to mate with a corresponding vehicle surface, such as the upper surface 18 of the vehicle 14. In one aspect, the lower surface 24 of the rail 16 may extend the entire length of the rail 16, such that an elongate lower surface is defined that corresponds to the structure of the vehicle to which the rail 16 will be mounted.

Figure 4:
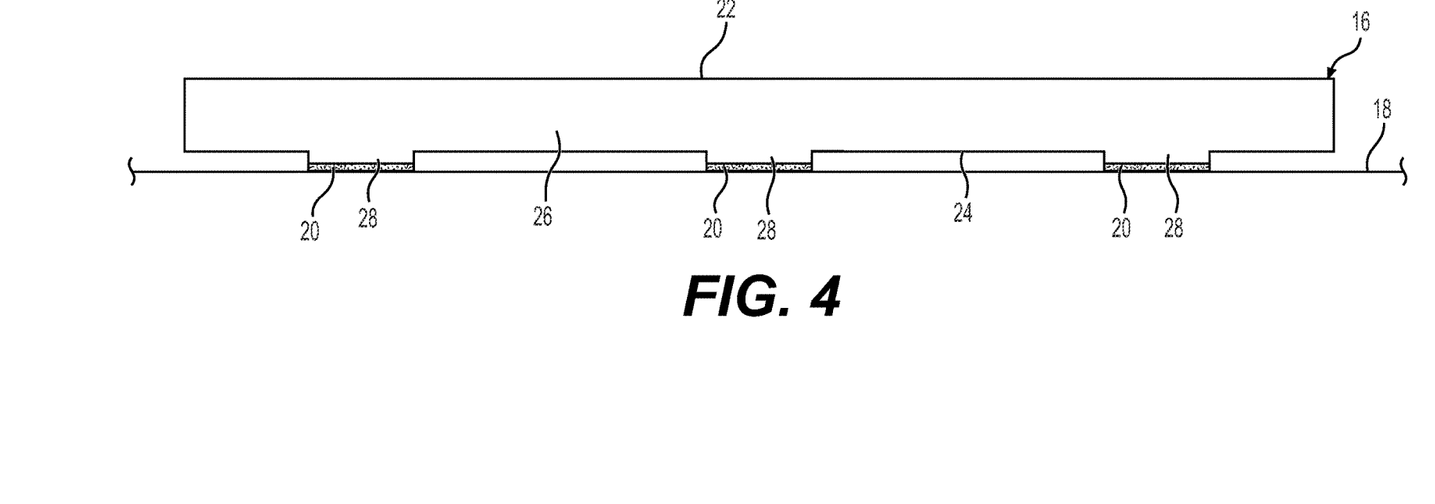
FIG. 4 is a schematic side view of a roof rail having multiple lower surfaces that attach to the upper surface of the vehicle.

With reference to FIG. 4, in another aspect, the lower surface 24 of the rail 16 may define multiple feet 28. Each of the feet 28 may define a portion of the lower surface 24. In this approach, the rail 16 may include multiple distinct attachments to the vehicle structure, with an open space defined beneath the rail 16 and longitudinally between the locations of the feet 28. The gasket 20 may be disposed between the lower surfaces 24 and the upper surface 18 of the vehicle 14.

The rail 16 may have a generally solid cross-section and may be formed as a single piece. In another aspect, the rail 16 may be formed as the assembly of two pieces that define an inner chamber or cavity 27 (FIG. 3).

As described above, the gasket 20 may be disposed between the rail 16 and the vehicle 14. More particularly, the gasket 20 may be disposed beneath the lower surface 24 of the rail 16 and above the upper surface 18 of the vehicle, such as the roof.

In one aspect, the gasket 20 is in the form of a liquid that may be robotically applied, and which cures in place to form the barrier between the rail 16 and the vehicle structure to perform all of the functions of a traditional gasket, such as isolating the roof rail from the vehicle, reducing rattle, providing water resistance, and the like. The gasket 20 may therefore be applied in a liquid state to the rail 16, either after the rail 16 has been formed or during the formation of the rail 16.

The gasket 20 may be applied either before or after the rail 16 has been installed on the vehicle. For example, the rail 16 may be attached to the vehicle 14 without the gasket and secured to the vehicle 14 using traditional mounting methods, such as fasteners or the like. The gasket 20 material may then be applied to the rail 16 to an area between the rail 16 and the vehicle structure. The liquid material of the gasket 20 may then cure after application to define the final shape of the gasket 20 and provide the benefits of the gasket described above.

In another aspect, the liquid gasket material may be applied to the lower surface 24 of the rail 16 prior to the rail 16 being mounted to the vehicle. The material of the gasket 20 may adhere to the rail 16, such that the rail 16 may be easily attached to the vehicle structure, thereby installing the gasket 20 between the vehicle structure and rail 16 when the rail 16 is installed.

The rail 16 may include various structure on the lower surface 24 thereof to accommodate the liquid gasket material. In one aspect, shown in FIG. 5, the lower surface 24 of the rail 16 may include one or more projections 24a that project downward from the lower surface 24 and toward the vehicle structure. In this aspect, the lower surface 24 of the rail 16 may be spaced away from the vehicle upper surface 18, thereby providing a space in which the liquid gasket 20 material may be applied, either before or after the installation of the rail 16 on the vehicle structure.

Figure 5:
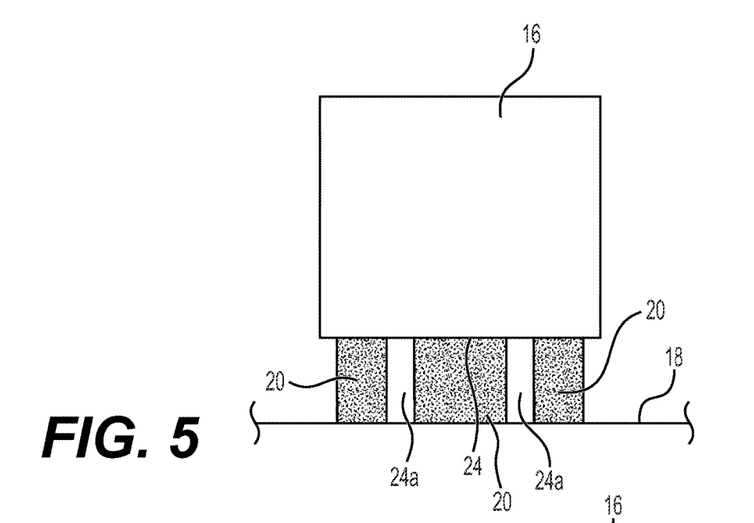
FIG. 5 is a schematic cross-sectional view of a roof rail with projections that space the roof rail from the upper surface of the vehicle and the gasket applied between the rail and the upper surface.

In some embodiments, the projections 24a may be disposed along an outer edge of the lower surface 24. For example, the projections 24a may extend along two edges of the lower surface 24 that are parallel and spaced apart from one another. In another example, the projections 24a may be disposed along all of the outer edges of the lower surface, forming a wall and defining an enclosed cavity adjacent to the lower surface 24.

For example, the rail 16 may be attached to the vehicle structure prior to applying the liquid gasket material. The projections 24a may extend into contact with the vehicle structure, spacing away the lower surface 24. The liquid gasket material may be injected into that space, which can surround the projections 24a and fill the space between the lower surface 24 and the vehicle structure. While some portions of the rail 16 are in contact with the vehicle structure, a substantial majority of the lower surface 24 is isolated from the vehicle structure by the gasket 20.

Figure 6:
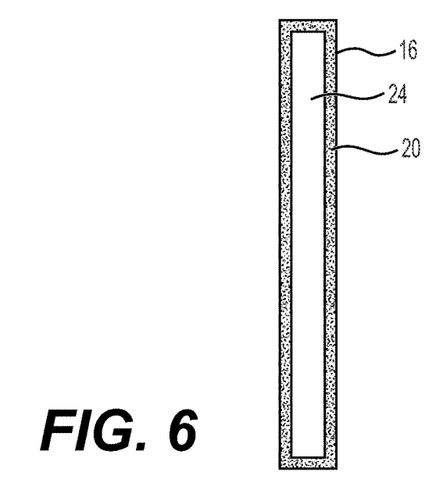
FIG. 6 is a schematic bottom view of the roof rail illustrating the gasket disposed about the entire perimeter of the roof rail.

With reference to FIG. 6, the gasket 20 may be applied around an entire perimeter of the lower surface 24 of the rail 16. The gasket 20 may, therefore, enclose the area beneath the rail 16, limiting or preventing intrusion of water and other debris under the rail 16. In some embodiments, the gasket 20 may be disposed on the lower surface 24 of the rail 16, and along the peripheral edges thereof. In some embodiments, the gasket 20 may extend around and downwardly from the sides of the rail 16, such that both the lateral side surfaces and the front and rear surfaces of the rail 16 have the gasket 20 applied thereto, but with the gasket 20 not extending under the lower surface 24. In some embodiments, the gasket 20 may extend downwardly from the sides of the rail 16, and also under the peripheral edges of the lower surface 24.

Figure 7:
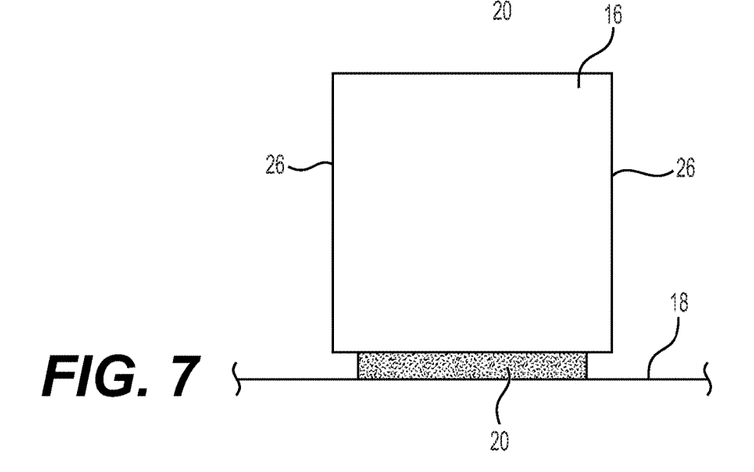
FIG. 7 is a schematic cross-sectional view of the gasket in a sub-flush arrangement.

With reference to FIG. 7, the gasket 20 may be sub-flush relative to the side surfaces 26 of the rail 16. The gasket 20 may also be sub-flush relative to the ends of the rail 16. Put another way, the outer surfaces or the perimeter of the gasket may be offset inwardly relative to the outer surfaces (i.e. the side surfaces 26 and the ends) of the rail 16. In this aspect, the gasket 20 preferably may extend around the entire perimeter, but may not be visible from outside of the rail 16 when viewed from above. It will be appreciated, however, that the gasket 20 may be visible when viewed up close or from the side. In the sub-flush arrangement, the gasket 20 may be made from a material that is not UV stable. However, because the gasket 20 is blocked from view from above, the gasket 20 may still function sufficiently due to its sub-flush arrangement. In this arrangement, UV exposure is reduced.

Figure 8:
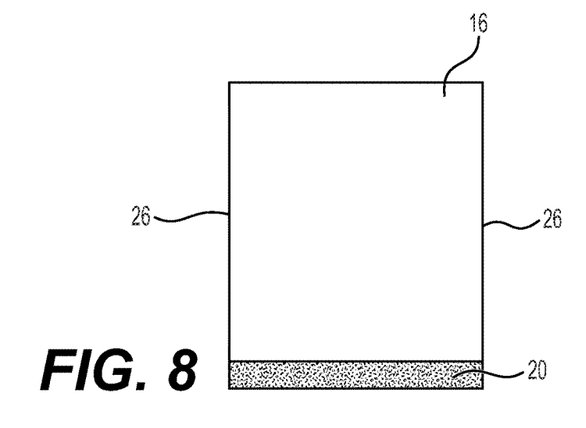
FIG. 8 is a schematic cross-sectional view of the gasket in a flush arrangement.

In another aspect, shown in FIG. 8, the gasket 20 may be arranged flush with the rail 16. In this aspect, the cross-sectional width of the gasket 20 may be approximately the same as the cross-sectional width of the bottom of the rail 16. Thus, the gasket 20 may be arranged flush to the rail. In this approach, the gasket 20 may still not be viewable from above, but may have increased exposure from the sides relative to a sub-flush gasket 20. In this approach, UV exposure is still reduced, but it is reduced to a lesser extent than the sub-flush arrangement.

Figure 9:
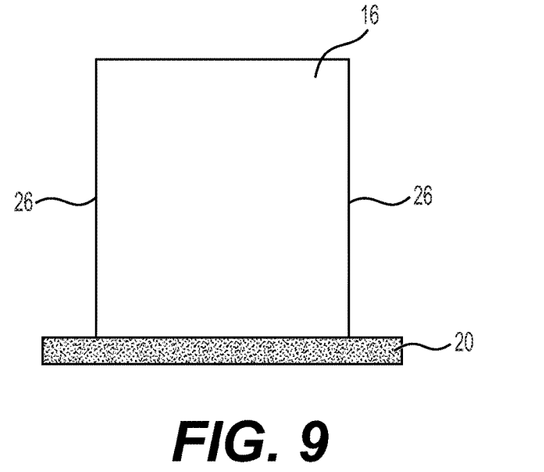
FIG. 9 is a schematic cross-sectional view of the gasket in a proud arrangement.

In another aspect, shown in FIG. 9, the gasket 20 may be proud relative to the side surfaces 26 of the rail 16. In other words, the gasket 20 may extend outwardly beyond the side surfaces 26 of the rail 16. In this arrangement, the gasket 20 may be viewable from above and also from the sides. In this arrangement, UV exposure is increased relative to the flush and sub-flush arrangements described above. It will be appreciated that the gasket may have a variety of different configurations and may be formed of a variety of different materials.

The above-described sub-flush, flush, and proud arrangements of the gasket relative to the rail 16 may be used for the rail 16 when the lower surface 24 is generally flat or when the lower surface of the rail 16 includes the protrusions 24a. When the rail 16 is flat, the gasket 20 is preferably applied to the lower surface prior to the rail 16 being mounted to the vehicle structure. However, in one aspect, spacers (not shown) may be placed between the rail 16 and the vehicle structure, such that the liquid gasket material may be inserted between the rail 16 and the vehicle structure while the spacers are in place, with the spacers being removed during or after application of the gasket 20.

Figure 10:
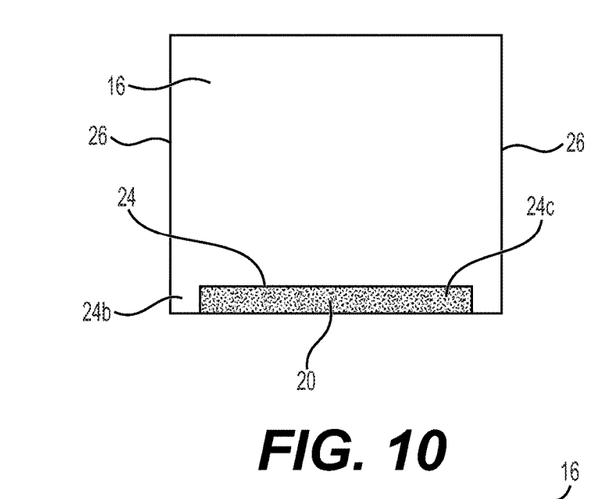
FIG. 10 is a schematic cross-sectional view of outer ledge portions defining a cavity in which the gasket is disposed.

With reference to FIG. 10, the gasket 20 may also be applied to the rail 16 when the lower surface 24 of the rail 16 includes an outer ledge portion 24b that extends downward from the lower surface 24 of the rail 16. The rail 16 therefore may define a lower cavity 24c in which the gasket 20 may be applied. In this aspect, the gasket 20 may be applied in a sub-flush arrangement, with the ledge portion 24b blocking and limiting exposure of the gasket 20 from the sides.

As described above, the gasket 20 may be applied as a liquid. The liquid material of the gasket may be applied robotically, using a nozzle. The nozzle size, and in particular the size of the nozzle tip may be selected based on the size and shape of the rail 16 and whether the gasket 20 is applied in a sub-flush, flush, or proud arrangement.

Figure 11:
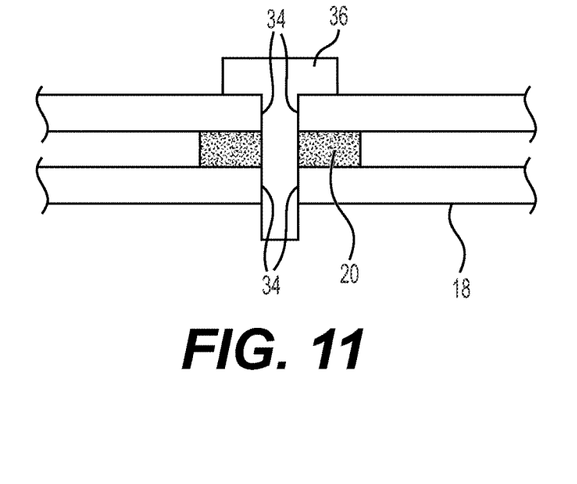
FIG. 11 is a schematic cross-sectional view illustrating the gasket used as a water seal.

The gasket 20 may also be used as a replacement for water seals that are typically used with roof rails. Water seals are typically die-cut pieces of foam having a ring form, and may include an adhesive tape. The water seals may be placed around various orifices, such as holes 34 used for fasteners 36. The use of the gasket 20 applied in a liquid state may eliminate the need for water seals. Rather than apply the water seals, the liquid material of the gasket 20 may be introduced in place of the water seals. The gasket 20 may be applied in place of water seals either as part of the overall application of the gasket 20, or at individual locations corresponding to the location of the water seals. The robotic control program that applies the gasket 20 may be programmed to apply the liquid gasket material at predetermined and specified water seal locations. An example of the gasket 20 used as a water seal is shown in FIG. 11.

Figure 12:
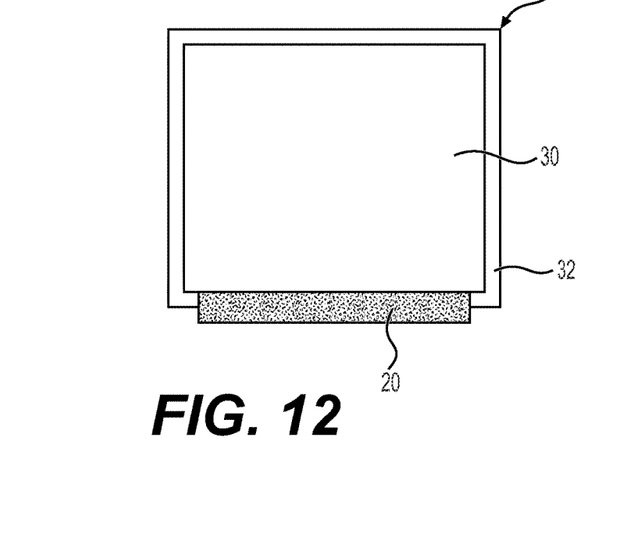
FIG. 12 is a schematic cross-sectional view illustrating the gasket applied to the lower surface of the roof rail and plating applied over the remainder of the roof rail.

With reference to FIG. 12, in addition to providing traditional gasket functionality, the gasket 20 in the form of liquid material may also be used as part of a metal plating process for the rails 16. The rails 16 may be designed to be plated, such as via chrome plating. More particularly, the rail 16 may be formed by a plateable resin material 30, where plating 32, such as chrome plating, is applied to the plateable resin material 30 to create the finished part. The plateable resin material 30 may be used in an injection molding process to define the size and shape of the rail 16. The rail 16 may then be plated by the plating materials, which will bond to the plateable resin material 30 of the rail 16 to define the plated rail 16. It will be appreciated that the rail 16 may also be formed of a combination of plateable and non-plateable resin material in an injection molding process. For example, portions of the rail 16 may be formed of a plateable material while and adjacent portion may be formed of a non-plateable material. Then as the rail 16 is subjected to a metal plating process, only the portion formed of the plateable portion will have a metal layer formed thereon. This will allow the roof rail to have a variety of different appearances. The non-plateable portion may also be formed of a color resin to further provide different and attractive aesthetics.

In one aspect, the material of the gasket 20 may be a material that can bond to the plateable resin substrate of the rail 16. In this aspect, during the molding process, the liquid material of the gasket 20 may be applied after molding and before plating. It will be appreciated that this step can be done inside of the mold. The gasket 20 may also be subjected to a curing process, including by UV or thermal processing. The gasket 20 may therefore bond to the rail 16 in areas that are not be plated. For example, the lower surface 24 of the rail 16 may not be plated, as it is not visible when installed.

The gasket 20 may therefore act as a barrier to plating, which may reduce the amount of premium plating materials, such as copper, nickel, etc. that are used in the plating process. The gasket 20 may act as a barrier due to the gasket material not being plateable. Put another way, the material of the gasket 20 may be selected to bond to the plateable resin material 30, but it will not bond with the plating material 32. The plating material, similar to the gasket 20, will bond to the plateable resin substrate, but it will not bond to the gasket 20.

Accordingly, the gasket 20 may be robotically applied to the rail 16 during the molding process or after the molding process has formed the plateable resin substrate. After applying the gasket 20 to the rail 16, the rail 16 and gasket 20 may undergo the plating process, with the plating material 32 bonding to the portions of the rail 16 that are not covered by the gasket 20, which may typically be the upper surface 22 and side surfaces 26. In this approach, the gasket 20 may therefore act as a "resist coating" on the rail 16, such that another resist coating does not need to be applied prior to the plating process. According to an aspect the gasket is formed from a material that can survive the plating process without affecting its integrity or performance. Specifically, according to this aspect, the gasket material should be able to withstand stiffening, cracking, absorption of chemicals or solvent experienced in the plating process and be substantially non-porous. An exemplary gasket material is Loctite SI5950. It will be appreciated that a variety of other suitable materials may be utilized. It will also be appreciated that the choice of gasket material may depend on the plating process. According to a further aspect, the gasket may be formed a liquid cure in place material. According to still another aspect, the gasket is compatible with roof rails formed of different materials, including ABS and nylons.

Application of the liquid gasket 20 to the rail 16 as described above therefore provides a number of benefits relative to traditional installation of pre-formed gaskets. For instance, part mass is reduced, tooling investment is reduced, and assembly labor is reduced. The use of premium materials during plating is reduced when the gasket 20 is used as a resist coating to act as an isolator for current flow. According to an aspect, isolating portions or all (if a continuous gasket) of the backside of the rail from plating helps reduce costs. Additional benefits may include reduction in scrap material and corresponding reduction in material use and cost. Overall cost reductions may be realized by applying the liquid gasket material during the rail injection mold time. Aesthetic benefits may also be realized, in particular in arrangements in which the gasket 20 is applied in a sub-flush manner.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of manufacturing a roof rail, the method comprising:
    applying a liquid gasket material to a lower surface of a rail member having an elongate shape, wherein the liquid gasket material is configured not to bond with a plating material used in a metal plating process;
    curing the liquid gasket material into a solid form to define a gasket on the lower surface of the rail member; and
    performing the metal plating process on the rail member and the gasket using the plating material to form a metal layer on areas of the rail member that are not covered by the gasket,
    wherein the gasket acts as a barrier to plating at least a portion of the lower surface of the rail member, thereby blocking formation of the metal layer thereupon in the metal plating process, and
    wherein the lower surface of the rail member is a mating surface configured to mate with and attach to a corresponding vehicle structure.

2. The method of claim 1, wherein the method further includes:
    installing the roof rail on the corresponding vehicle structure; and
    sealing the lower surface of the rail member against the corresponding vehicle structure.

3. The method of claim 1, wherein the rail member is formed of a plateable resin material configured to form the metal layer thereupon in the metal plating process.

4. The method of claim 1, wherein the gasket provides a watertight seal between the rail member and the corresponding vehicle structure when the rail member is attached to the corresponding vehicle structure.

5. The method of claim 1, wherein the rail member includes a plurality of projections each extending perpendicularly from the lower surface.

6. The method of claim 1, further comprising: forming the rail member in a molding process and applying the liquid gasket material after the molding process.

7. The method of claim 1, further comprising: forming the rail member of a plateable resin material by an injection molding process.

8. The method of claim 7, wherein the liquid gasket material is applied to the plateable resin material of the rail member during the injection molding process.

9. A method of manufacturing a roof rail, the method comprising:
    applying a liquid gasket material to a lower surface of a rail member having an elongate shape, wherein the liquid gasket material is configured not to bond with a plating material used in a metal plating process;
    curing the liquid gasket material into a solid form to define a gasket on the lower surface of the rail member; and
    performing the metal plating process on the rail member and the gasket using the plating material to form a metal layer on areas of the rail member that are not covered by the gasket, wherein the gasket acts as a barrier to plating at least a portion of the lower surface of the rail member, thereby blocking formation of the metal layer thereupon in the metal plating process, and
    wherein the rail member includes a plurality of projections, with each projection of the plurality of projections extending perpendicularly from the lower surface and configured to contact an upper surface of a roof of a vehicle when the rail member is attached thereto.

10. The method of claim 9, wherein the lower surface and the plurality of projections define a cavity and the gasket is disposed within the cavity.

11. A method of manufacturing a roof rail, the method comprising:
    forming a rail member having an elongate shape from a plateable resin material configured to bond with a plating material used in a metal plating process;
    applying a liquid gasket material to a lower surface of the rail member, wherein the liquid gasket material is configured not to bond with the plating material used in the metal plating process;
    curing the liquid gasket material into a solid form to define a gasket; and
    performing the metal plating process on the rail member and the gasket using the plating material to form a metal layer on areas of the rail member that are not covered by the gasket,
    wherein the gasket is disposed sub-flush relative to an outer surface of the rail member.

12. The method of claim 11, wherein the lower surface of the rail member is flat.

13. The method of claim 11, wherein the gasket extends around an entire perimeter of the lower surface.

14. The method of claim 11, wherein the gasket provides a watertight seal between the rail member and an upper surface of a roof of a vehicle when the rail member is attached thereto; and
    wherein the rail member includes a plurality of projections, with each projection of the plurality of projections extending perpendicularly from the lower surface and configured to contact the upper surface of the roof when the rail member is attached thereto.

15. The method of claim 14, wherein each projection of the plurality of projections is disposed at an outer edge of the lower surface.

16. The method of claim 14, wherein the lower surface and the projections define a cavity and the gasket is disposed within the cavity.

\* \* \* \* \*